United States Patent Office 3,649,577
Patented Mar. 14, 1972

3,649,577
SYNERGISTIC STABILIZER FOR HALOGENATED RESINS AND RESIN COMPOSITIONS STABILIZED THEREWITH
Robert D. Dworkin, Old Bridge, N.J., and Christian H. Stapfer, Newtown, Pa., assignors to Carlisle Chemical Works, Inc., Reading, Ohio
No Drawing. Filed Jan. 7, 1970, Ser. No. 1,320
Int. Cl. C08f 45/62
U.S. Cl. 260—23
10 Claims

ABSTRACT OF THE DISCLOSURE

A combination of magnesium maleate and a zinc salt of an aliphatic carboxylic acid produces a halogenated resin stabilizer having synergistic properties. The stabilizer is particularly useful for polyvinyl chloride food packaging materials and small amounts of a phenolic antioxidant will further improve stabilization.

---

This invention relates to synergistic stabilizers containing low cost metal soaps and to the stabilization of halogenated resins against thermal degradation. More particularly, this invention relates to magnesium maleate-zinc carboxylate stabilizers which exhibit synergistic properties in the stabilization of halogenated resins, such as polyvinyl chloride.

The rapid degradation of halogenated resins when exposed to heat is a well known phenomenon and numerous metallic and organo-metallic compounds have been described and used as stabilizers. Among the most successful combinations are the mixed calcium-zinc soaps of fatty acids which, aside from imparting good stability to the processed polymer, have the merit of being essentially non-toxic. A substantial effort has and is being made throughout the industry to develop stabilizer combinations which will show the highest possible stabilizing activity at the lowest possible cost. In this quest for an optimum cost-performance ratio, magnesium soaps of car- have been used in the past for their low cost and low toxicity.

We have found that various polyvinyl chloride formulations could be effectively stabilized against heat degradation by incorporating a mixture of magnesium maleate and a zinc carboxylate and, optionally, a phenolic antioxidant to the resin blend. We have discovered that the addition of small amounts of a zinc soap to magnesium maleate increases the long term stability of a resin formulation as well as improves its early color. This discovery was unexpected, since most magnesium salts have very little if any stabilizing activity when used by themselves. The addition of zinc salts of carboxylic acids such as stearic or 2-ethylhexoic acids exhibits a synergistic influence on the efficacy of the magnesium salt thus improving the long term stability of the resin blend by nearly 100%. The early color is also significantly improved by these synergistic stabilizers.

The substantial and unexpected improvement in the stabilizing properties of magnesium maleate resulting from the presence of small amounts of a zinc carboxylate is not exhibited by other magnesium salts. Although magnesium stearate, magnesium salicylate and magnesium fumarate all demonstrate substantially the same stabilizing effect as magnesium maleate when used alone, only magnesium maleate is substantially improved and acts synergistically with zinc carboxylates.

Zinc salts of straight or branched chain carboxylic acids having 6 to 20 carbon atoms are suitable for practicing the present invention. Examples of zinc carboxylates include zinc hexoate, zinc octoate, zinc 2-ethylhexoate, zinc decoate, zinc laurate, zinc palmitate and zinc stearate.

The zinc carboxylate can be combined with the magnesium maleate in amounts up to about 15% and amounts as low as about 1% of the combined weight are effective. However, a content of the zinc salt varying from 1 to 5% based on the total weight of the zinc salt and magnesium maleate is preferred. Up to 10% zinc carboxylate may be used when long term stability is secondary to the importance of good early color and even at 15% zinc carboxylate, early color is better than formulations containing magnesium maleate alone.

Another embodiment of the present invention relates to the addition of a phenolic antioxidant to the synergistic combination of magnesium maleate and a zinc carboxylate. We have discovered that phenolic antioxidants such as p-nonyl phenol and 2,6-tert. butyl-p-cresol further enhances the stabilizing activity of the magnesium maleate-zinc carboxylate system when such antioxidants are added in proportions varying between 1 and 10% by weight of the magnesium-zinc stabilizer. Other examples of phenolic antioxidants include p-octyl phenol and diphenylol propane as well as other well known phenolic antioxidants.

The recommended usage level of the above-described stabilizer systems varies from 0.1 to 10% by weight of the resin and 1 to 3 weight percent stabilizer based upon the resin is preferred.

The stabilizers of the present invention are most effective on halogen-containing resins. Suitable resins include polyvinyl chloride, polyvinyl bromide and polyvinylidene chloride. The resin may also be a blend of two or more polyvinyl halide resins, such as a polyvinyl chloride-polyvinylidene chloride blend or a copolymer of a vinyl halide with a copolymerizable monomer. Copolymers containing at least 50 weight percent of the vinyl halide are favored and those sanctioned for use in food packaging are preferred. Examples of comonomers for vinyl chloride include acrylonitrile, vinyl acetate, vinylidene chloride, acrylic acid esters, such as, n-butyl acrylate, n-butyl methacrylate, ethyl acrylate, ethyl methacrylate, 2-ethylhexyl acrylate, methyl acrylate and methyl methacrylate, and styrene. Similar comonomers are useful for vinylidene chloride copolymers.

The resins stabilized with the synergistic combinations of the present invention may also contain conventional lubricants, pigments, plasticizers, solvents and the like. These materials, like the resins, are preferably those sanctioned for food packaging use.

The following examples are presented.

EXAMPLE 1

Nine formulations were prepared containing 100 parts of PVC–40, a general purpose polyvinyl chloride suspension resin manufactured by the Diamond Shamrock Co., 5 parts of dioctyl phthalate, 5 parts of an epoxidized soybean oil and 0.25 part of stearic acid. Eight were stabilized with 1.0 part of a stabilizer as indicated in Table I.

The formulations were then processed on a two roll mill at 320° F. for 5 minutes, and exposed for one hour at 370° F. in an air circulation oven. At 10 minute intervals a sample of each formulation was removed from the oven and compared for relative discoloration with the formulation containing no stabilizer. The presence of these magnesium salts without the zinc stearate did not improve the long term stability of the formulations since they discolored strongly after 10 minutes of exposure. However, the magnesium salts, and particularly magnesium maleate, containing 2.5% zinc stearate significantly improved the long term stability since strong discoloration did not occur until after 20 minutes of exposure and actual decomposition was extended until after 50 minutes.

The results of this test are shown in Table I.

TABLE I

| Resin formulation containing— | Time in minutes of exposure at 370° F. leading to— | | | |
|---|---|---|---|---|
| | First discoloration | Medium discoloration | Strong discoloration | Decomposition |
| No stabilizer | 0 | | 10 | 30 |
| Mg stearate | 0 | | 10 | 30 |
| Mg salicylate | 0 | | 10 | 30 |
| Mg maleate | | 10 | 20 | 30 |
| Mg fumarate | 0 | | 10 | 30 |
| Mg stear.+Zn stearate | 10 | 10 | 20 | 50 |
| Mg sal.+Zn stearate | 10 | 20 | 30 | 50 |
| Mg mal.+Zn stearate | 10 | 30 | 40 | 50 |
| Mg fum.+Zu stearate | 10 | 20 | 30 | 50 |

EXAMPLE 2

The procedure of Example I was repeated with formulations containing 100 parts of VC-80, a suspension polyvinyl chloride resin manufactured by The Borden Chemical Co., 10 parts of dioctyl phthalate, 5 parts of an epoxidized soybean oil and 0.25 part of stearic acid. The results obtained with this slightly more flexible resin blend containing the same stabilizers as in Example 1 were essentially the same as those of Example 1 and are shown in Table II.

TABLE II

| Resin formulation containing | Time in minutes of exposure at 370° F. leading to— | | | |
|---|---|---|---|---|
| | First discoloration | Medium discoloration | Strong discoloration | Decomposition |
| No stabilizer | 10 | 20 | 30 | 40 |
| Mg stearate | 10 | | 20 | 30 |
| Mg salicylate | 10 | | 20 | 60 |
| Mg maleate | 10 | | 20 | 60 |
| Mg fumarate | 10 | | 20 | 60 |
| Mg stear.+Zn stearate | 10 | | 20 | 40 |
| Mg sal.+Zn stearate | 10 | | 20 | 60 |
| Mg mal.+Zn stearate | 20 | 20 | 60 | 70 |
| Mg fum.+Zn stearate | 10 | 20 | 50 | 60 |

EXAMPLE 3

Blends from a master batch corresponding to the formulations of Example 2 were stabilized with 1% of a mixture of magnesium maleate with various amounts of zinc stearate ranging from 2.5% up to 15%. The blends were then processed following the standard procedure of Example 1. Extensive amounts of zinc stearate had a deleterious effect on the long term stability of the system. The blend containing the mixture of magnesium maleate with 2.5% zinc stearate showed a long term stability twice as good as that containing the mixture of magnesium maleate with 15% zinc stearate. The superiority of the magnesium maleate-zinc carboxylate system is shown to be independent of the zinc concentration when early color is of prime consideration by a comparison with other magnesium salt-zinc carboxylate systems at different zinc concentrations. The results of this test are reported in Table III.

TABLE III

| Resin formulation containing— | Time in minutes of exposure at 370° F. leading to— | |
|---|---|---|
| | First discoloration | Decomposition |
| 1.0 part of a mixture of Mg maleate with— | | |
| 15% Zn stearate | 20 | 30 |
| 10% Zn stearate | 30 | 40 |
| 5% Zn stearate | 30 | 50 |
| 2.5% Zn stearate | 30 | 60 |
| 1.0 part of a mixture of— | | |
| Mg stear.+5% Zn stear | 0 | |
| Mg sal.+5% Zn stear | 0 | |
| Mg mal.+5% Zn stear | 20 | |
| Mg stear.+10% Zn stear | 0 | |
| Mg sal.+10% Zn stear | 0 | |
| Mg mal.+10% Zn stear | 20 | |

EXAMPLE 4

Rigid formulations containing 100 parts of Geon 103EP, a general purpose polyvinyl chloride suspension resin manufactured by the B. F. Goodrich Co., and 0.5 part of Advawax 135, an ester lubricant, were respectively stabilized with 1.5 parts of magnesium maleate alone, 1.5 parts of zinc stearate alone, the same amount of a mixture of magnesium maleate with 2.5% of zinc stearate, the same amount of a mixture of magnesium maleate with zinc octoate, the same amount of each zinc carboxylate-magnesium maleate mixture containing 5% of para nonyl phenol and the same amount of each zinc carboxylate-magnesium maleate mixture containing 2,6-di-ter.-butyl-para-cresol.

These formulations contained no plasticizer and were particularly difficult to stabilize with simple metal soaps since processing as in Example 1 caused rapid discoloration.

The blend containing zinc stearate alone became strongly discolored almost immediately after milling began. The blend containing magnesium maleate alone discolored almost as quickly on the mill. The mixtures containing zinc salts significantly improved the early color by delaying discoloration until exposure to the 370° F. oven. The addition of a phenolic antioxidant further extended the improvement in early color.

EXAMPLE 5

The same stabilizer systems of Example 4 were used with the plasticized formulation of Example 2. The results of Example 4 were confirmed and demonstrated to be poor because of excessive heat generated during milling in the absence of a plasticizer. The very slow color development of the formulations containing the plasticizer and magnesium maleate-zinc carboxylate or magnesium maleate-zinc carboxylate-phenol systems as compared with the formulation containing magnesium maleate as sole stabilizer is shown by the results in Table IV.

TABLE IV

| Resin formulation containing— | Time in minutes of exposure at 370° F. leading to— | | |
|---|---|---|---|
| | First discoloration | Medium discoloration | Strong discoloration |
| 1.5 parts of— | | | |
| Magnesium maleate | | 10 | 20 |
| Mg mal.+Zn stearate | 20 | | 40 |
| Mg mal.+Zn octoate | 20 | | 40 |
| Mg mal.+Zn stear.+BHT | 20 | 40 | 50 |
| Mg mal.+Zn stear.+non. ph | 20 | 40 | 50 |
| Mg mal.+Zn oct.+BHT | 30 | | 40 |
| Mg mal.+Zn oct.+non. ph | 20 | 40 | 50 |

What is claimed is:

1. A stabilizer for halogen containing resins consisting essentially of a synergistic mixture of about 85 to 99 weight percent magnesium maleate and about 1 to 15 weight percent of a zinc carboxylate selected from the group consisting of straight and branched chain aliphatic acids having 6 to 20 carbon atoms.

2. A stabilizer composition comprising the synergistic mixture of claim 1 and 1 to 10 weight percent based on said mixture of a phenolic antioxidant.

3. The stabilizer of claim 1 wherein the zinc carboxylate is present in an amount of about 1 to 5 weight percent.

4. The stabilizer of claim 3 wherein said zinc carboxylate is selected from the group consisting of zinc octoate, zinc palmitate and zinc stearate.

5. A heat-stabilized resin composition comprising a resin selected from the group consisting of polyvinyl chloride, polyvinylidene chloride, copolymers of vinyl chloride with a copolymerizable monomer selected from the group consisting of acrylonitrile, vinyl acetate, vinylidene chloride, n-butyl acrylate, n-butyl methacrylate, ethyl acrylate, ethyl methacrylate, 2-ethylhexyl acrylate, methyl acrylate, methyl methacrylate and styrene, copolymers of vinylidene chloride with a copolymerizable monomer selected from the group consisting of acrylonitrile, ethyl acrylate and methyl acrylate and about 0.1 to 10 weight percent of the stabilizer of claim 3.

6. The heat-stabilized resin according to claim 5 wherein said resin is selected from the group consisting of polyvinyl chloride, polyvinylidene chloride and copolymers of vinyl chloride with vinyl acetate or vinylidene chloride, said stabilizer is present in an amount of about 1 to 3 weight percent and said zinc carboxylate is selected from the group consisting of zinc octoate, zinc palmitate and zinc stearate.

7. The heat-stabilized resin according to claim 6 wherein said stabilizer contains about 1 to 10 weight percent of a phenolic antioxidant selected from the group consisting of nonylphenol and 2,6-ditertiary butyl-p-cresol.

8. A food packaging material comprising polyvinyl chloride, dioctyl phthalate, epoxidized soybean oil and about 1 to 3 weight percent, based on the polyvinyl chloride, of the stabilizer according to claim 3.

9. The food packaging material of claim 8 wherein zinc carboxylate is zinc stearate.

10. The food packaging material of claim 9 wherein the stabilizer contains 1 to 10 weight percent nonylphenol.

References Cited

UNITED STATES PATENTS

| | | | |
|---|---|---|---|
| 3,417,039 | 12/1968 | Penneck | 260—23 |
| 2,446,976 | 8/1948 | Cousins | 260—23 |
| 3,396,132 | 8/1968 | Perry et al. | 260—23 |
| 2,617,784 | 11/1952 | Slocombe et al. | 260—45.85 X |

OTHER REFERENCES

Penn: "PVC Technology," pg. 144 (1962).

M. J. WELSH, Primary Examiner

D. J. BARRACK, Assistant Examiner

U.S. Cl. X.R.

99—171 LP; 252—400; 260—45.75 R, 45.85, 45.95